(No Model.)

C. O. HEGGEM.
PISTON HEAD FOR STEAM ENGINES.

No. 514,621. Patented Feb. 13, 1894.

Witnesses:—

Inventor
Charles O. Heggem
By W. K. Miller
Attorney

UNITED STATES PATENT OFFICE.

CHARLES O. HEGGEM, OF MASSILLON, OHIO, ASSIGNOR TO THE RUSSELL & COMPANY, OF SAME PLACE.

PISTON-HEAD FOR STEAM-ENGINES.

SPECIFICATION forming part of Letters Patent No. 514,621, dated February 13, 1894.

Application filed March 29, 1893. Serial No. 468,147. (No model.)

*To all whom it may concern:*

Be it known that I, CHARLES O. HEGGEM, a citizen of the United States, and a resident of Massillon, county of Stark, State of Ohio, have invented a new and useful Improvement in Piston-Heads for Steam-Engines, of which the following is a full, clear, and exact description, reference being had to the accompanying drawings, making part of this specification.

My invention relates to an improvement in piston heads for steam engines, particularly for that class of engines adapted for high speed, the object of which is to provide a light, strong and inexpansible head, the body portion of which is formed of a single piece of metal.

With these objects in view my invention consists of certain features of construction and combination of parts as hereinafter described and pointed out in the claims.

Figure 1:
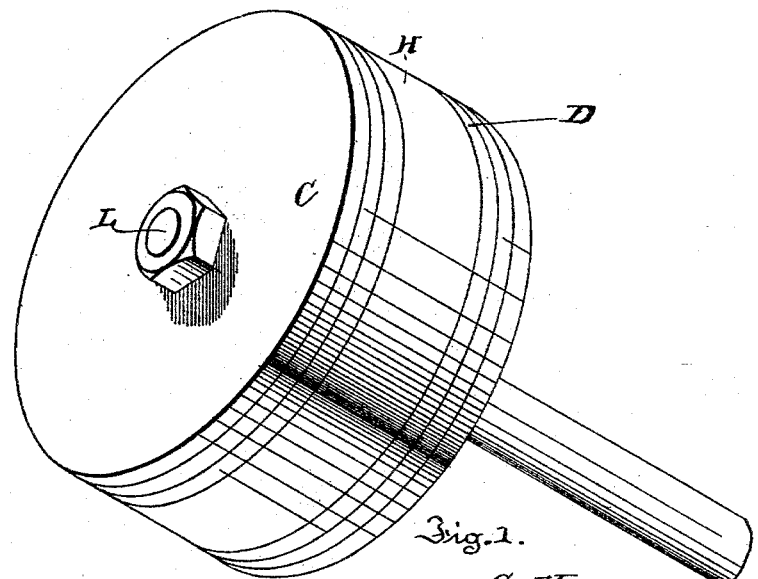
Figure 3:
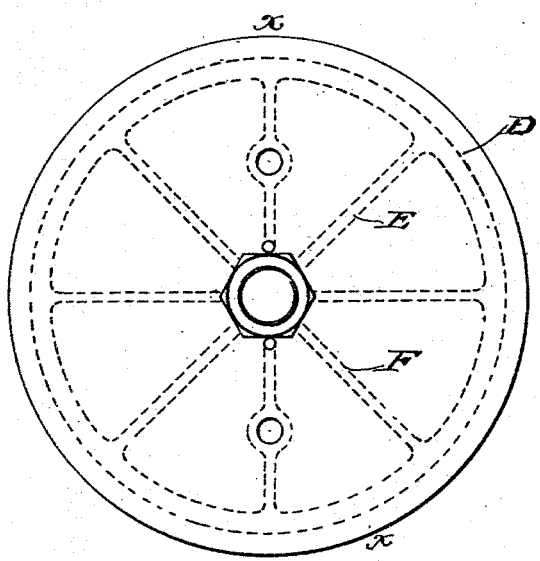
Figure 2:
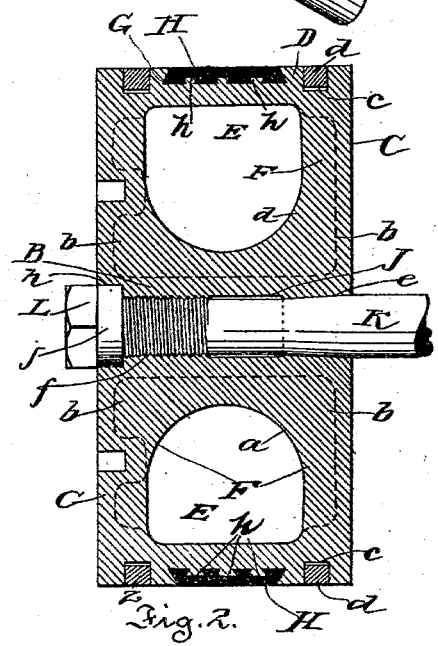

Figure 1, of the accompanying drawings is a view in perspective of a piston head, illustrating my invention. Fig. 2, is a transverse section through $x$ $x$, and Fig. 3, is a longitudinal section through $z$ $z$.

Referring to Fig. 2, representing a transverse section of the head, which is made of cast metal, having a central hub or sleeve B, sides C and rim D, that incloses an annular cell or open space E, divided at the hub and side portions by a series of braces F extending from the hub along the sides C to the rim D, as shown by the line $a$, see Fig. 2. The limit of the cells or spaces between the braces is shown by the dotted lines $b$. These parts are cast integral; the annular space E is cored out to lighten the head, and the braces F are provided to support the sides C, and rim D.

About the rim D is provided an annular dove tail recess G, in which is cast an annular ring of anti-friction metal H, at the sides of which are provided small grooves $c$, in which is placed packing rings $d$; but if preferred the rings $d$ may be omitted and small grooves substituted, to form a water packing.

At one side of the head in the circular aperture J of the hub is provided a tapered portion $e$, adapted to a similar tapered portion of the piston rod K, at the other side of the head in the aperture J is provided a threaded portion $f$, adapted to a similar thread on the end portion of the piston rod, and in the side of the head is provided a recess $h$. The threaded portion of the piston rod is turned into the threaded portion $f$ of the head, drawing the tapered portion of the rod against the tapered portion $e$ of the hub, the nut L having a circular portion $j$, is turned onto the end of the rod, the circular portion resting on the bottom of the recess $h$; this nut serves as a set or jam nut by which the head is secured against rotation on the rod K.

As hereinafter stated the object of this invention is to provide a fixed or inexpansible head, the diameter of which has been determined at the factory and cannot be expanded by the operator.

The anti-friction metal ring is carefully fitted to the inner face of the cylinder, the speed of the head is such that little if any steam can pass between the head and the cylinder during its movement in one way, and the frequent reversal of the movement, practically prevents such an escape or leakage of steam. The fixed conditions of the head effectually prevent an inexperienced operator from expanding the head, and thereby causing great friction between the head and cylinder and consequently a great loss of power.

To more securely hold the anti-friction ring in place and prevent it from bulging at its middle, I provide short dove-tail ribs $h$ so that when this ring is cast in the groove G the metal will flow between the ribs which thereby serve as an additional means for securely fastening the ring in place. The ring is then ground down to conform to the interior diameter of the cylinder.

Having thus fully described the nature and object of my invention, what I claim, and desire to secure by Letters Patent, is—

1. A piston head having a peripheral dove-tail groove, a series of short dove-tail ribs projecting from the base of said groove and an anti-friction ring cast in said groove and covering said ribs, substantially as herein described.

2. A piston head consisting of the hub B, the sides C, braces F rim D having a peripheral groove, an anti-friction ring cast in said groove, and packing rings d, substantially as herein described.

In testimony whereof I have hereunto set my hand this 23d day of March, A. D. 1893.

CHARLES O. HEGGEM.

Witnesses:
JESSE W. SMITH,
WM. A. HARRIS.

It is hereby certified that the assignee, "The Russell & Company," in Letters Patent No. 514,621, granted February 13, 1894, upon the application of Charles O. Heggem, of Massillon, Ohio, for an improvement in "Piston-Heads for Steam-Engines," should have been described and specified as *Russell & Co.*, instead of "The Russell & Company"; and that the said Letters Patent should be read with this correction therein that the same may conform to the record of the case in the Patent Office.

Signed, countersigned, and sealed this 27th day of February, A. D. 1894.

[SEAL.]

JNO. M. REYNOLDS,
*Assistant Secretary of the Interior.*

Countersigned:

JOHN S. SEYMOUR,
*Commissioner of Patents.*